United States Patent  (10) Patent No.: US 10,915,413 B2
Heidel et al.                           (45) Date of Patent:    Feb. 9, 2021

(54) DATABASE REDO LOG OPTIMIZATION BY SKIPPING MVCC REDO LOG RECORDS

(71) Applicant: SAP SE, Walldorf (DE)

(72) Inventors: Martin Heidel, Walldorf (DE); Andreas Tonder, Weinheim (DE); Shiping Chen, Dublin, CA (US)

(73) Assignee: SAP SE, Walldorf (DE)

(*) Notice: Subject to any disclaimer, the term of this patent is extended or adjusted under 35 U.S.C. 154(b) by 309 days.

(21) Appl. No.: 15/410,701

(22) Filed: Jan. 19, 2017

(65) Prior Publication Data

US 2018/0203771 A1    Jul. 19, 2018

(51) Int. Cl.
G06F 11/14 (2006.01)
G06F 16/21 (2019.01)

(52) U.S. Cl.
CPC ........ *G06F 11/1471* (2013.01); *G06F 16/211* (2019.01); *G06F 2201/80* (2013.01)

(58) Field of Classification Search
CPC ........... G06F 11/1469; G06F 17/30292; G06F 2201/87
See application file for complete search history.

(56) References Cited

U.S. PATENT DOCUMENTS

| | | | |
|---|---|---|---|
| 2008/0140629 A1* | 6/2008 | Porter | G06F 17/30551 |
| 2008/0249988 A1* | 10/2008 | Chaitanya | G06F 17/30377 |
| 2011/0231447 A1* | 9/2011 | Starkey | G06F 17/30575 707/792 |
| 2014/0149697 A1* | 5/2014 | Thomsen | G06F 11/004 711/162 |
| 2014/0195492 A1* | 7/2014 | Wilding | G06F 11/1471 707/684 |
| 2015/0120673 A1* | 4/2015 | Rolfe | G06F 11/1458 707/674 |
| 2015/0278281 A1* | 10/2015 | Zhang | G06F 17/30008 707/703 |

* cited by examiner

*Primary Examiner* — Ashish Thomas
*Assistant Examiner* — Dustin D Eyers
(74) *Attorney, Agent, or Firm* — Jones Day

(57) ABSTRACT

Restoring of a database table in the database system (e.g., an in-memory insert-only database system, etc.) is initiated. Thereafter, a transaction log volume storing data log records and multi-version concurrency control (MVCC) log records corresponding to the database table is accessed. Based on such access, data log records corresponding to the database table are replayed while insert and update MVCC log records corresponding to the database table are skipped. Subsequently, restoring of the database table in the database system is finalized. Related apparatus, systems, techniques and articles are also described.

20 Claims, 4 Drawing Sheets

DATABASE REDO LOG OPTIMIZATION BY SKIPPING MVCC REDO LOG RECORDS

TECHNICAL FIELD

The subject matter described herein relates to enhanced recovery of database systems by skipping multi-version concurrency control (MVCC) redo log records as part of a restore operation.

BACKGROUND

Database systems are susceptible to failure for a variety of reasons including both software and hardware related issues. As a result, transaction logs that record various actions performed by such database systems have been adopted. These transaction logs record various actions performed by the database systems which can be later replayed, if needed, as part of a recovery operation.

SUMMARY

In one aspect, restoring of a database table in the database system (e.g., an in-memory insert-only database system, etc.) is initiated. Thereafter, a transaction log volume storing data log records and multi-version concurrency control (MVCC) log records corresponding to the database table is accessed. Based on such access, data log records corresponding to the database table are replayed while insert and update MVCC log records corresponding to the database table are skipped. Subsequently, restoring of the database table in the database system is finalized.

The replayed data log records can be based on a most recent savepoint by the database system.

The data log records and MVCC control log records can be logged in response to database manipulation language (DML) statements received by the database system. For example, the MVCC insert records can be logged for insert statements and the MVCC delete records can be logged for update statements to ensure backward compatibility. Logging of both of the MVCC insert records for insert statements and MVCC delete records for update statements can be skipped when implementing a new database system. Delete MVCC records can be augmented with an identifier indicating that such delete MVCC records are part of delete operations rather than update operations.

The in-memory database can be a column-oriented database loading data into main-memory and storing the transaction log volume in physical persistence.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter enables more rapid replay of redo logs, which in turn, allow for more rapid database system recovery. Such an arrangement is advantageous in that it reduces database downtime compared to conventional techniques.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

The current subject matter is directed to systems and techniques for enhanced recovery of database systems.

Figure 1:
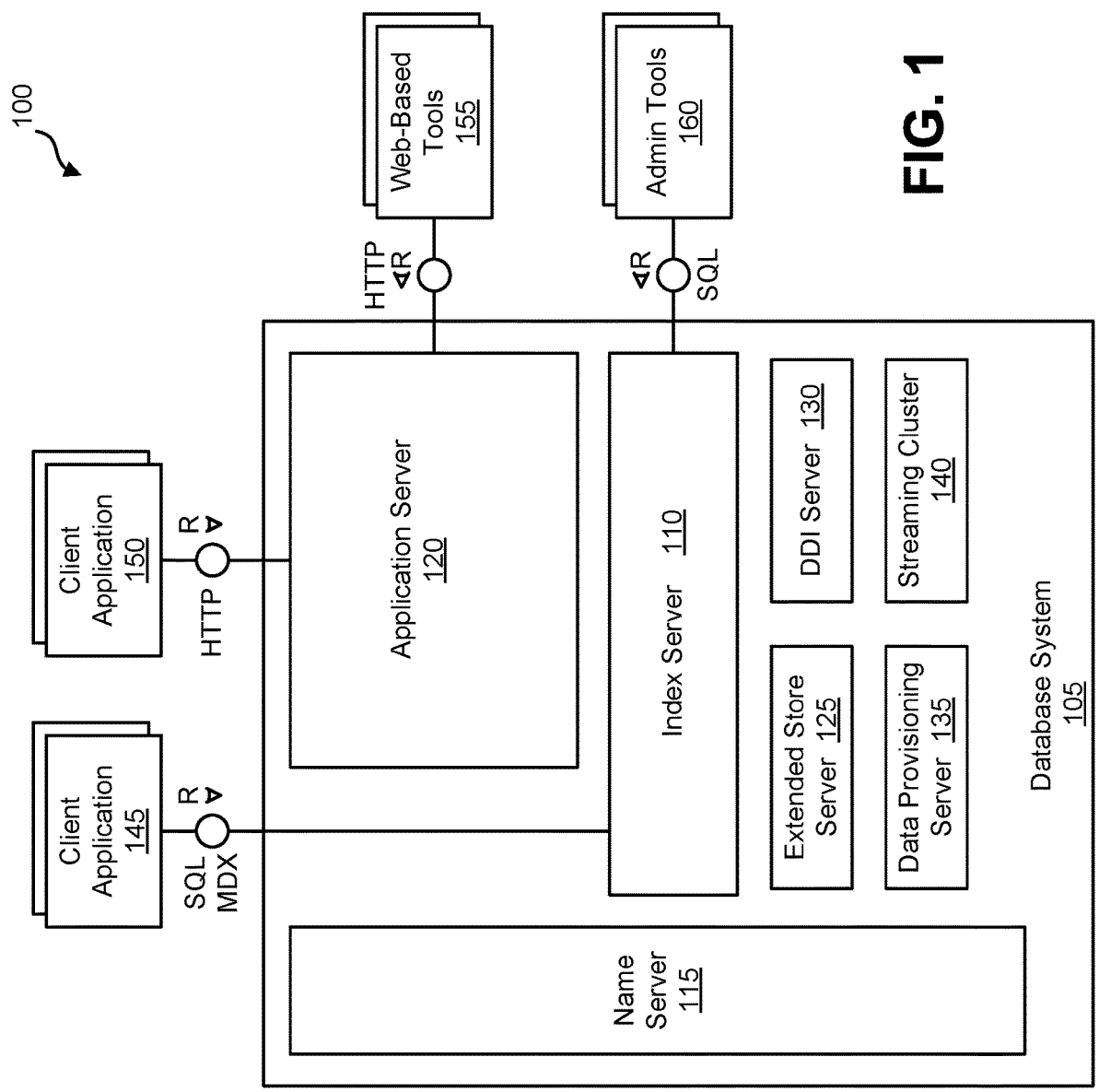
FIG. 1 is a system diagram illustrating an example database system for use in connection with the current subject matter.

FIG. 1 is a diagram 100 illustrating a database system 105 that can be used to implement aspects of the current subject matter. The database system 105 can, for example, be an in-memory database in which all relevant data is kept in main memory so that read operations can be executed without disk I/O and in which disk storage is required to make any changes durables. The database system 105 can include a plurality of servers including, for example, one or more of an index server 110, a name server 115, and/or an application server 120. The database system 105 can also include one or more of an extended store server 125, a database deployment infrastructure (DDI) server 130, a data provisioning server 135, and/or a streaming cluster 140. The database system 105 can be accessed by a plurality of remote clients 145, 150 via different protocols such as SQL/MDX (by way of the index server 110) and/or web-based protocols such as HTTP (by way of the application server 120).

The index server 110 can contain in-memory data stores and engines for processing data. The index server 110 can also be accessed by remote tools (via, for example, SQL queries), that can provide various development environment and administration tools. Additional details regarding an example implementation of the index server 110 is described and illustrated in connection with diagram 300 of FIG. 3.

The name server 115 can own information about the topology of the database system 105. In a distributed database system, the name server 115 can know where various components are running and which data is located on which server. In a database system 105 with multiple database containers, the name server 115 can have information about existing database containers and it can also host the system database. For example, the name server 115 can manage the information about existing tenant databases. Unlike a name server 115 in a single-container system, the name server 115 in a database system 105 having multiple database containers does not store topology information such as the location of tables in a distributed database. In a multi-container database system 105 such database-level topology information can be stored as part of the catalogs of the tenant databases.

The application server 120 can enable native web applications used by one or more remote clients 150 accessing the database system 105 via a web protocol such as HTTP. The application server 120 can allow developers to write and run various database applications without the need to run an additional application server. The application server 120 can also used to run web-based tools 155 for administration, life-cycle management and development. Other administration and development tools 160 can directly access the index server 110 for, example, via SQL and other protocols.

The extended store server 125 can be part of a dynamic tiering option that can include a high-performance disk-based column store for very big data up to the petabyte range and beyond. Less frequently accessed data (for which is it non-optimal to maintain in main memory of the index server 110) can be put into the extended store server 125. The dynamic tiering of the extended store server 125 allows for hosting of very large databases with a reduced cost of ownership as compared to conventional arrangements.

The DDI server 130 can be a separate server process that is part of a database deployment infrastructure (DDI). The DDI can be a layer of the database system 105 that simplifies the deployment of database objects using declarative design time artifacts. DDI can ensure a consistent deployment, for example by guaranteeing that multiple objects are deployed in the right sequence based on dependencies, and by implementing a transactional all-or-nothing deployment.

The data provisioning server 135 can provide enterprise information management and enable capabilities such as data provisioning in real time and batch mode, real-time data transformations, data quality functions, adapters for various types of remote sources, and an adapter SDK for developing additional adapters.

The streaming cluster 140 allows for various types of data streams (i.e., data feeds, etc.) to be utilized by the database system 105. The streaming cluster 140 allows for both consumption of data streams and for complex event processing.

Figure 2:
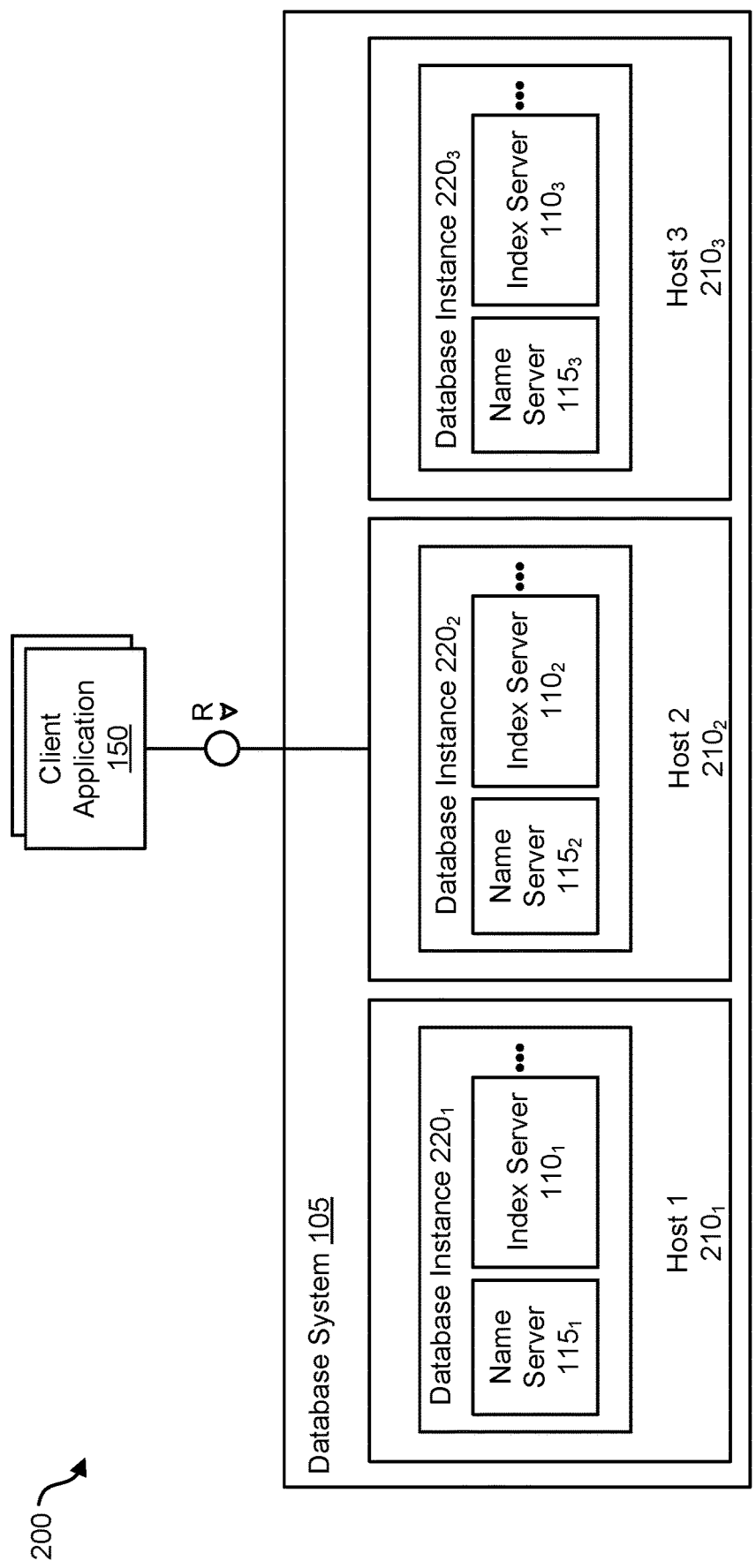
FIG. 2 is a system diagram illustrating a distributed database system having a plurality of database instances.

FIG. 2 is a diagram 200 illustrating a variation of the database system 105 that can support distribution of server components across multiple hosts for scalability and/or availability purposes. This database system 105 can, for example, be identified by a single system ID (SID) and it is perceived as one unit from the perspective of an administrator, who can install, update, start up, shut down, or backup the system as a whole. The different components of the database system 105 can share the same metadata, and requests from client applications 230 can be transparently dispatched to different servers $110_{1-3}$, $120_{1-3}$, in the system, if required.

As is illustrated in FIG. 2, the distributed database system 105 can be installed on more than one host $210_{1-3}$. Each host $210_{1-3}$ is a machine that can comprise at least one data processor (e.g., a CPU, etc.), memory, storage, a network interface, and an operation system and which executes part of the database system 105. Each host $210_{1-3}$ can execute a database instance $220_{1-3}$ which comprises the set of components of the distributed database system 105 that are installed on one host $210_{1-3}$. FIG. 2 shows a distributed system with three hosts, which each run a name server $110_{1-3}$, index server $120_{1-3}$, and so on (other components are omitted to simplify the illustration).

Figure 3:
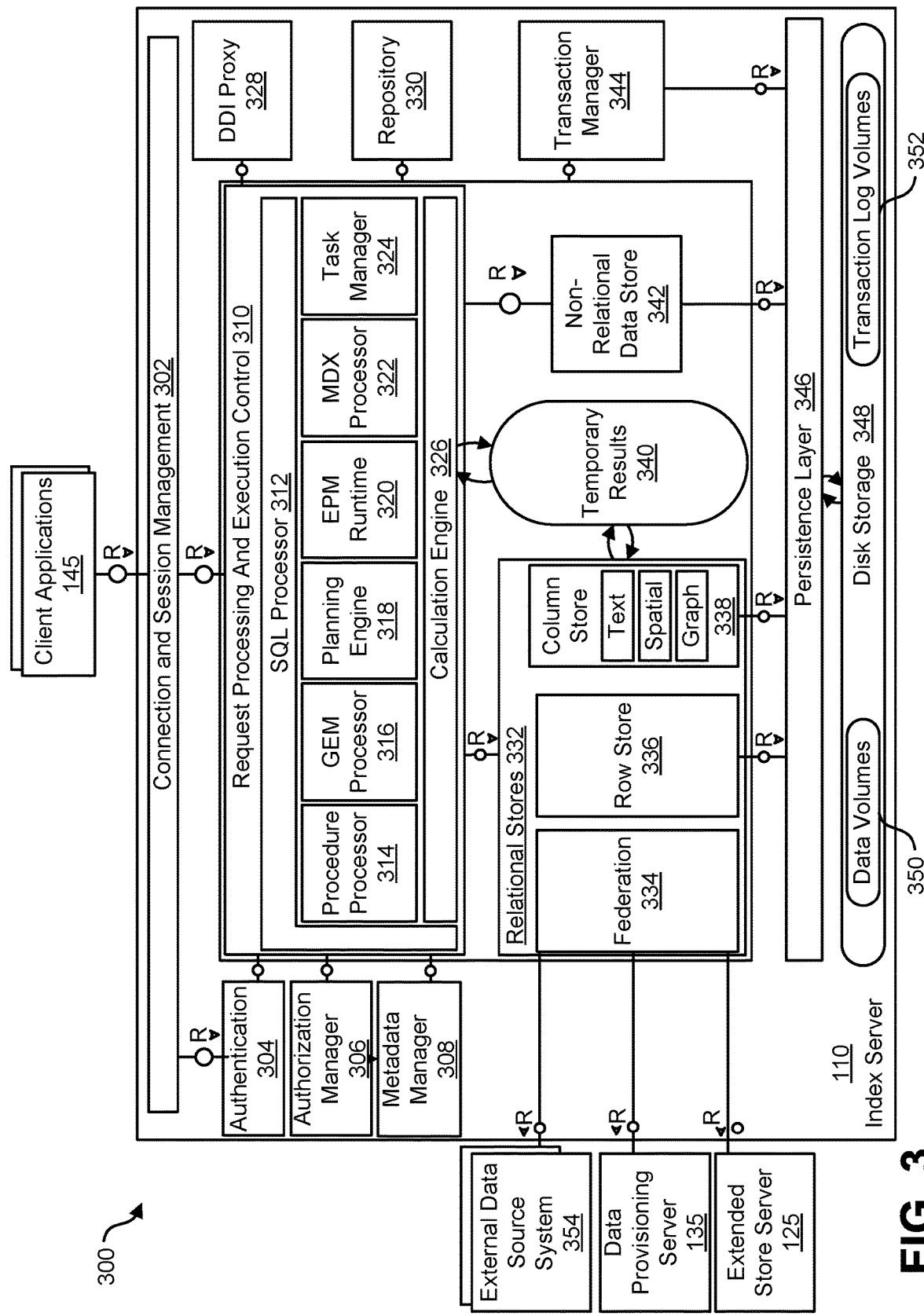
FIG. 3 is a system diagram of an index server forming part of the database system of FIG. 1.

FIG. 3 is a diagram 300 illustrating an architecture for the index server 110 (which can, as indicated above, be one of many instances). A connection and session management component 302 can create and manage sessions and connections for the client applications 145. For each session, a set of parameters can be maintained such as, for example, auto commit settings or the current transaction isolation level.

Requests from the client applications 145 can be processed and executed by way of a request processing and execution control component 310. The database system 105 offers rich programming capabilities for running application-specific calculations inside the database system. In addition to SQL, MDX, and WIPE, the database system 105 can provide different programming languages for different use cases. SQLScript can be used to write database procedures and user defined functions that can be used in SQL statements. The L language is an imperative language, which can be used to implement operator logic that can be called by SQLScript procedures and for writing user-defined functions.

Once a session is established, client applications 145 typically use SQL statements to communicate with the index server 110 which can be handled by a SQL processor 312 within the request processing and execution control component 310. Analytical applications can use the multidimensional query language MDX (MultiDimensional eXpressions) via an MDX processor 322. For graph data, applications can use GEM (Graph Query and Manipulation) via a GEM processor 316, a graph query and manipulation language. SQL statements and MDX queries can be sent over the same connection with the client application 145 using the same network communication protocol. GEM statements can be sent using a built-in SQL system procedure.

The index server 110 can include an authentication component 304 that can be invoked with a new connection with a client application 145 is established. Users can be authenticated either by the database system 105 itself (login with user and password) or authentication can be delegated to an external authentication provider. An authorization manager 306 can be invoked by other components of the database system 145 to check whether the user has the required privileges to execute the requested operations.

Each statement can processed in the context of a transaction. New sessions can be implicitly assigned to a new transaction. The index server 110 can include a transaction manager 344 that coordinates transactions, controls transactional isolation, and keeps track of running and closed transactions. When a transaction is committed or rolled back, the transaction manager 344 can inform the involved engines about this event so they can execute necessary actions. The transaction manager 344 can provide various types of concurrency control and it can cooperate with a persistence layer 346 to achieve atomic and durable transactions.

Incoming SQL requests from the client applications 145 can be received by the SQL processor 312. Data manipulation statements can be executed by the SQL processor 312 itself. Other types of requests can be delegated to the respective components. Data definition statements can be dispatched to a metadata manager 308, transaction control statements can be forwarded to the transaction manager 344, planning commands can be routed to a planning engine 318, and task related commands can forwarded to a task manager 324 (which can be part of a larger task framework) Incoming MDX requests can be delegated to the MDX processor 322. Procedure calls can be forwarded to the procedure processor 314, which further dispatches the calls, for example to a calculation engine 326, the GEM processor 316, a repository 300, or a DDI proxy 328.

The index server 110 can also include a planning engine 318 that allows planning applications, for instance for financial planning, to execute basic planning operations in the database layer. One such basic operation is to create a new version of a data set as a copy of an existing one while applying filters and transformations. For example, planning data for a new year can be created as a copy of the data from the previous year. Another example for a planning operation is the disaggregation operation that distributes target values from higher to lower aggregation levels based on a distribution function.

The SQL processor 312 can include an enterprise performance management (EPM) runtime component 320 that can form part of a larger platform providing an infrastructure for developing and running enterprise performance management applications on the database system 105. While the planning engine 318 can provide basic planning operations, the EPM platform provides a foundation for complete planning applications, based on by application-specific planning models managed in the database system 105.

The calculation engine 326 can provide a common infrastructure that implements various features such as SQLScript, MDX, GEM, tasks, and planning operations. The SQLScript processor 312, the MDX processor 322, the planning engine 318, the task manager 324, and the GEM processor 316 can translate the different programming languages, query languages, and models into a common representation that is optimized and executed by the calculation engine 326. The calculation engine 326 can implement those features using temporary results 340 which can be based, in part, on data within the relational stores 332.

Metadata can be accessed via the metadata manager component 308. Metadata, in this context, can comprise a variety of objects, such as definitions of relational tables, columns, views, indexes and procedures. Metadata of all these types can be stored in one common database catalog for all stores. The database catalog can be stored in tables in a row store 336 forming part of a group of relational stores 332. Other aspects of the database system 105 including, for example, support and multi-version concurrency control can also be used for metadata management. In distributed systems, central metadata is shared across servers and the metadata manager 308 can coordinate or otherwise manage such sharing.

The relational stores 332 form the different data management components of the index server 110 and these relational stores can, for example, store data in main memory. The row store 336, a column store 338, and a federation component 334 are all relational data stores which can provide access to data organized in relational tables. The column store 338 can store relational tables column-wise (i.e., in a column-oriented fashion, etc.). The column store 338 can also comprise text search and analysis capabilities, support for spatial data, and operators and storage for graph-structured data. With regard to graph-structured data, from an application viewpoint, the column store 338 could be viewed as a non-relational and schema-flexible in-memory data store for graph-structured data. However, technically such a graph store is not a separate physical data store. Instead it is built using the column store 338, which can have a dedicated graph API.

The row store 336 can store relational tables row-wise. When a table is created, the creator can specify whether it should be row or column-based. Tables can be migrated between the two storage formats. While certain SQL extensions are only available for one kind of table (such as the "merge" command for column tables), standard SQL can be used on all tables. The index server 110 also provides functionality to combine both kinds of tables in one statement (join, sub query, union).

The federation component 334 can be viewed as a virtual relational data store. The federation component 334 can provide access to remote data in external data source system (s) 354 through virtual tables, which can be used in SQL queries in a fashion similar to normal tables.

The database system 105 can include an integration of a non-relational data store 342 into the index server 110. For example, the non-relational data store 342 can have data represented as networks of C++ objects, which can be persisted to disk. The non-relational data store 342 can be used, for example, for optimization and planning tasks that operate on large networks of data objects, for example in supply chain management. Unlike the row store 336 and the column store 338, the non-relational data store 342 does not use relational tables; rather, objects can be directly stored in containers provided by the persistence layer 346. Fixed size entry containers can be used to store objects of one class. Persisted objects can be loaded via their persisted object IDs, which can also be used to persist references between objects. In addition, access via in-memory indexes is supported. In that case, the objects need to contain search keys. The in-memory search index is created on first access. The non-relational data store 342 can be integrated with the transaction manager 344 to extends transaction management with sub-transactions, and to also provide a different locking protocol and implementation of multi version concurrency control.

An extended store is another relational store that can be used or otherwise form part of the database system 105. The extended store can, for example, be a disk-based column store optimized for managing very big tables, which ones do not want to keep in memory (as with the relational stores 332). The extended store can run in an extended store server 125 separate from the index server 110. The index server 110 can use the federation component 334 to send SQL statements to the extended store server 125.

The persistence layer 346 is responsible for durability and atomicity of transactions. The persistence layer 346 can ensure that the database system 105 is restored to the most recent committed state after a restart and that transactions are either completely executed or completely undone. To achieve this goal in an efficient way, the persistence layer 346 can use a combination of write-ahead logs, shadow paging and savepoints. The persistence layer 346 can provide interfaces for writing and reading persisted data and it can also contain a logger component that manages a transaction log. Transaction log entries can be written explicitly by using a log interface or implicitly when using the virtual file abstraction.

The persistence layer 236 stores data in persistent disk storage 348 which, in turn, can include data volumes 350 and/or transaction log volumes 352 that can be organized in pages. Different page sizes can be supported, for example, between 4k and 16M. Data can be loaded from the disk storage 348 and stored to disk page wise. For read and write access, pages can be loaded into a page buffer in memory. The page buffer need not have a minimum or maximum size, rather, all free memory not used for other things can be used for the page buffer. If the memory is needed elsewhere, least recently used pages can be removed from the cache. If a modified page is chosen to be removed, the page first needs to be persisted to disk storage 348. While the pages and the page buffer are managed by the persistence layer 346, the in-memory stores (i.e., the relational stores 332) can access data within loaded pages.

With database systems, such as database system 105, transaction logs can be used to ensure no data loss in case of system crash due to unexpected events such as power interruption. In runtime, for each database manipulation language (DML) statement execution, corresponding transaction redo log records are logged and flushed to disk in the transaction log volumes 352 before the transaction is committed. During recovery following a system crash, after restoring the database system 105 to the latest savepoint, all transaction log records stored in the transaction log volumes 352 are replayed to restore the database to the consistent state of time point before the crash.

Two types of log records are logged in the transaction log volumes 352 in order to restore the database: data log records and MVCC (Multiversion Concurrency Control) log records. Data log records can include the specific data changes made by the DML statements. For example, for an insert statement, one or many insert redo data log records can be written to disk in the transaction log volumes 352, which contain the first row number, number of rows to be inserted to a table, and the array of data that are inserted. For an update statement, one or many update redo data log records can be written to disk in the transaction log volumes 352, which contain the row numbers that would be updated and the corresponding new values for those to be updated rows.

MVCC redo records can be used to restore the visibility information for the modified rows in the relational stores 332. There can be two types of MVCC redo records: insert MVCC log records and delete MVCC log records. Insert MVCC log record can be used to restore a construction timestamp (CTS) of a particular row. Delete MVCC log record can be used to restore a destruction timestamp (DTS) of a particular row. The CTS and DTS information can be accessed to obtain corresponding timestamps to compute the visibility of the rows based on a read snapshot timestamp associated with a desired consistent view. Stated differently, the CTS and the DTS are used to determine which records are visible at any given time as part of doing a select operation.

During runtime, an insert statement received by the database system 105 causes one or many insert data log records and one insert MVCC log record to be generated in the transaction log volumes 352. An update statement received by the database system 105 generates one or many update data log records and one inset MVCC log record and delete MVCC log record in the transaction log volumes 352. A delete statement received by the database system 105 only generates one delete log record because marking the corresponding rows as deleted is sufficient to indicate that such rows are to be deleted/disregarded.

During recovery, replaying data log records from the transaction log volumes 352 restores the data part of the committed transactions and replaying MVCC log records restores the visibility part of the committed transactions. As a result, the database system 105 can be restored to its latest consistent state before the unexpected crash.

Log replaying is time consuming. For the same database table in the relational stores 332, log records from the transaction log volumes 352 have to be replayed in sequence. Before all logs are replayed, the database system 105 is not accessible. Reducing the log replay time is critical to shorten the recovery time of the database system 105.

With the current subject matter, DML redo operations are optimized by skipping MVCC log records during recovery of the database system 105 whenever possible. In particular, for an insert statement, insert MVCC records within the transaction log volumes 352 are skipped, and for update statements, insert MVCC and delete MVCC records within the transaction log volumes 352 are skipped. There are no changes require for delete statements. To distinguish "real" deletes from deletes as part of updates, delete MVCC records can be augmented with necessary identification information. In some cases, such as a standalone delete operation, delete MVCC records can have a bit or the like indicating that this record needs to be executed as data log records are not written for "pure" deletes.

The current subject matter takes advantage of the fact that all information contained in the MVCC log records is also available in the corresponding data log records. For example, insert data log records also include the information contained in corresponding insert MVCC record, namely the start row number and number of rows. Update data log records also include the row numbers that are to be updated, which are actually the information needed to do MVCC delete. By re-factoring the way how data log records are replayed, the database system 105 can be recovered without replaying insert MVCC records and delete MVCC records.

Figure 4:
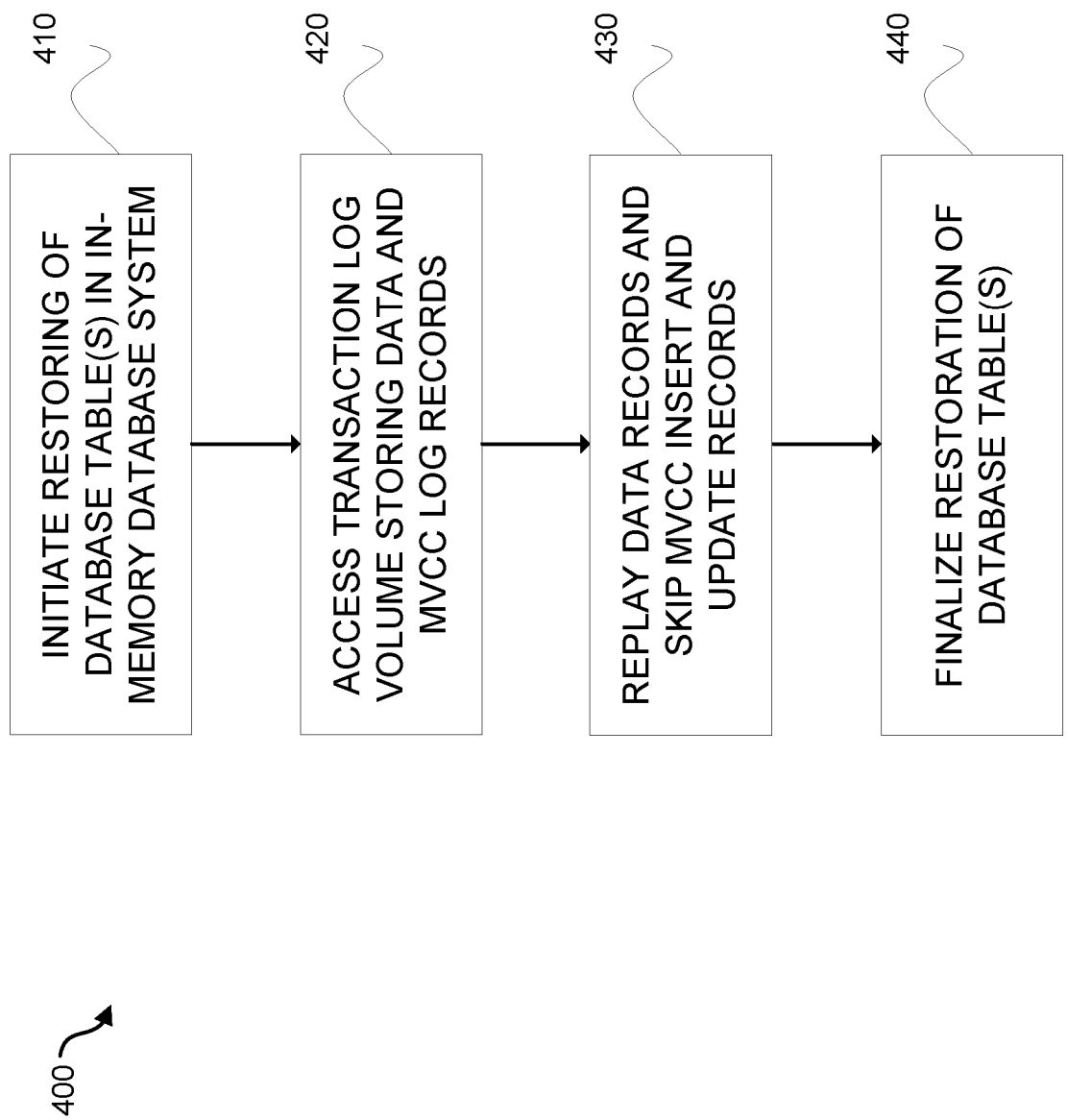
FIG. 4 is a process flow diagram database redo log optimization by skipping MVCC redo log records.

FIG. 4 is a process flow diagram 400 for restoring an insert-only in-memory database system in which, at 410, restoration of a database table in the database system is initiated. Thereafter, at 420, a transaction log volume storing data log records and multi-version concurrency control (MVCC) log records corresponding to the database table is accessed. Next, at 430, data log records corresponding to the database table are replayed while insert and update MVCC log records corresponding to the database table are skipped. Restoration of the database table is, at 440, then finalized.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, memory, and Programmable Logic Devices (PLDs), used to provide machine instructions and/or data to a programmable processor, including a computer-readable medium that receives machine instructions as a computer-readable signal. The term "computer-readable signal" refers to any signal used to provide machine instructions and/or data to a programmable processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device (e.g., a CRT (cathode ray tube) or LCD (liquid crystal display) monitor) for displaying information to the user and a keyboard and a pointing device (e.g., a mouse or a trackball) and/or a touchscreen by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for restoring an insert-only in-memory database system, the method comprising:
   initiating restoring of a database table in the database system;
   accessing a transaction log volume storing data log records and multi-version concurrency control (MVCC) log records corresponding to the database table;
   replaying data log records corresponding to the database table while skipping (i) insert MVCC log records corresponding to insert statements and (ii) update and delete MVCC log records corresponding to update statements; and
   finalizing restoring of the database table in the database system;
   wherein:
      an insert data log record and an insert MVCC log record is generated for each insert statement received by the database system, the insert data log records comprising information contained in corresponding insert MVCC records to restore a construction timestamp (CTS) of a particular row and are used in restoring the database table in the database system; and
      an update data log record, an insert MVCC log record, and a delete MVCC log record is generated for each update statement received by the database system, the update data log records comprising information required to perform MVCC delete operations to restore a destruction timestamp (DTS) of a particular row and are used in restoring the database table in the database system.

2. The method of claim 1, wherein the replayed data log records are based on a most recent savepoint by the database system.

3. The method of claim 1 further comprising:
   logging the data log records and MVCC control log records in response to database manipulation language (DML) statements received by the database system.

4. The method of claim 1 further comprising:
   augmenting delete MVCC records with an identifier indicating that such delete MVCC records are part of delete operations rather than update operations.

5. The method of claim 1 further comprising:
   logging the MVCC insert records for insert statements and MVCC delete records for update statements to ensure backward compatibility.

6. The method of claim 1 further comprising:
   skipping logging of the MVCC insert records for insert statements and MVCC delete records for update statements when implementing a new database system.

7. The method of claim 1, wherein the in-memory database is a column-oriented database loading data into main-memory and storing the transaction log volume in physical persistence.

8. A system comprising:
   an insert-only in-memory database system;
   at least one data processor; and
   memory storing instructions which, when executed by the at least one data processor, result in operations comprising:
      initiating restoring of a database table in the database system;

accessing a transaction log volume storing data log records and multi-version concurrency control (MVCC) log records corresponding to the database table;

replaying data log records corresponding to the database table while skipping (i) insert MVCC log records corresponding to insert statements and (ii) insert and update and delete MVCC log records corresponding to update statements the database table; and finalizing restoring of the database table in the database system;

wherein:

an insert data log record and an insert MVCC log record is generated for each insert statement received by the database system, the insert data log records comprising information contained in corresponding insert MVCC records to restore a construction timestamp (CTS) of a particular row and are used in restoring the database table in the database system; and an update data log record, an insert MVCC log record, and a delete MVCC log record is generated for each update statement received by the database system, the update data log records comprising information required to perform MVCC delete operations to restore a destruction timestamp (DTS) of a particular row and are used in restoring the database table in the database system.

9. The system of claim 8, wherein the replayed data log records are based on a most recent savepoint by the database system.

10. The system of claim 8, wherein the operations further comprise:

logging the data log records and MVCC control log records in response to database manipulation language (DML) statements received by the database system.

11. The system of claim 8, wherein the operations further comprise:

augmenting delete MVCC records with an identifier indicating that such delete MVCC records are part of delete operations rather than update operations.

12. The system of claim 8, wherein the operations further comprise:

logging the MVCC insert records for insert statements and MVCC delete records for update statements to ensure backward compatibility.

13. The system of claim 8, wherein the operations further comprise:

skipping logging of the MVCC insert records for insert statements and MVCC delete records for update statements when implementing a new database system.

14. The system of claim 8, wherein the in-memory database is a column-oriented database loading data into main-memory and storing the transaction log volume in physical persistence.

15. A non-transitory computer program product for restoring an insert-only in-memory database system, the computer program product storing instructions which, when executed by at least one data processor forming part of at least one computing device, result in operations comprising:

generating an insert data log record and an insert MVCC log record in a transaction log volume for each insert statement received by a database system and associated with a database table, the insert data log records comprising information contained in corresponding insert multi-version concurrency control (MVCC) records to restore a construction timestamp (CTS) of a particular row and are used in restoring the database table in the database system;

generating an update data log record, an insert MVCC log record, and a delete MVCC log record in the transaction log volume for each update statement received by the database system associated with the database table, the update data log records comprising information required to perform MVCC delete operations to restore a destruction timestamp (DTS) of a particular row and are used in restoring the database table in the database system;

generating only a delete log record in the transaction log volume for each delete statement received by the database system associated with the database table;

initiating restoring of the database table in the database system;

accessing the transaction log volume;

replaying data log records corresponding to the database table while skipping (i) insert MVCC log records corresponding to insert statements which are used to restore a construction timestamp (CTS) of a particular row and (ii) insert and update and delete MVCC log records corresponding to update statements in the database table; and finalizing restoring of the database table in the database system.

16. The computer program product of claim 15, wherein the replayed data log records are based on a most recent savepoint by the database system.

17. The computer program product of claim 15, wherein the operations further comprise:

logging the data log records and MVCC control log records in response to database manipulation language (DML) statements received by the database system.

18. The computer program product of claim 15, wherein the operations further comprise:

augmenting delete MVCC records with an identifier indicating that such delete MVCC records are part of delete operations rather than update operations.

19. The computer program product of claim 15, wherein the operations further comprise:

logging the MVCC insert records for insert statements and MVCC delete records for update statements to ensure backward compatibility; and skipping logging of the MVCC insert records for insert statements and MVCC delete records for update statements when implementing a new database system.

20. The computer program product of claim 15, wherein the in-memory database is a column-oriented database loading data into main-memory and storing the transaction log volume in physical persistence.

* * * * *